(12) United States Patent
Keane et al.

(10) Patent No.: US 7,395,354 B2
(45) Date of Patent: Jul. 1, 2008

(54) METHODS AND SYSTEMS FOR RESOLVING ADDRESSING CONFLICTS BASED ON TUNNEL INFORMATION

(75) Inventors: John Keane, Metuchen, NJ (US); Christopher Macey, Red Bank, NJ (US)

(73) Assignee: Corente, Inc., East Brunswick, NJ (US)

( * ) Notice: Subject to any disclaimer, the term of this patent is extended or adjusted under 35 U.S.C. 154(b) by 733 days.

(21) Appl. No.: 10/078,366

(22) Filed: Feb. 21, 2002

(65) Prior Publication Data

US 2003/0158962 A1    Aug. 21, 2003

(51) Int. Cl.
*G06F 15/16* (2006.01)
(52) U.S. Cl. ................................ 709/245; 709/238
(58) Field of Classification Search ................ 709/203, 709/231, 238, 239, 242, 243, 245; 370/389, 370/392, 400, 464, 474
See application file for complete search history.

(56) References Cited

U.S. PATENT DOCUMENTS

| | | | | |
|---|---|---|---|---|
| 5,825,772 | A | 10/1998 | Dobbins et al. | 370/396 |
| 5,864,666 | A | 1/1999 | Shrader | 395/187.01 |
| 5,875,472 | A | 2/1999 | Bauman et al. | 711/150 |
| 5,918,019 | A | 6/1999 | Valencia | 395/200.57 |
| 6,041,166 | A | 3/2000 | Hart et al. | 395/200.68 |
| 6,061,796 | A | 5/2000 | Chen et al. | |
| 6,092,200 | A | 7/2000 | Muniyappa et al. | 713/201 |
| 6,094,437 | A | 7/2000 | Loehndorf, Jr. et al. | 370/420 |
| 6,104,716 | A | 8/2000 | Crichton et al. | |
| 6,154,839 | A | 11/2000 | Arrow et al. | |
| 6,173,399 | B1 | 1/2001 | Gilbrech | 713/153 |
| 6,175,917 | B1 | 1/2001 | Arrow et al. | |
| 6,195,705 | B1 | 2/2001 | Leung | 709/245 |
| 6,249,523 | B1 * | 6/2001 | Hrastar et al. | 370/401 |
| 6,339,595 | B1 | 1/2002 | Rekhter et al. | 372/392 |
| 6,381,646 | B2 | 4/2002 | Zhang et al. | 709/227 |
| 6,393,488 | B1 | 5/2002 | Araujo | 709/245 |
| 6,407,988 | B1 | 6/2002 | Agraharam et al. | 370/328 |

(Continued)

FOREIGN PATENT DOCUMENTS

EP    0 302 646    2/1989

(Continued)

OTHER PUBLICATIONS

RFC-2401, S. Kent et al., "Security Architecture for The Internet Protocol," The Internet Society (1998).

(Continued)

*Primary Examiner*—William Vaughn
*Assistant Examiner*—Joseph Maniwang
(74) *Attorney, Agent, or Firm*—Finnegan, Henderson, Farabow, Garrett & Dunner, LLP

(57) ABSTRACT

Methods and systems are provided for resolving an addressing conflict between a first processor in a first network and a second processor in a second network. When an addressing conflict is detected between a first address of the first processor and a second address of the second processor, tunnel information is removed from one or more packets received from the first processor. Based on the removed tunnel information, the packets are associated with the detected addressing conflict and a translated address is determined. Based on the translated address, the packets are then forwarded.

4 Claims, 6 Drawing Sheets

U.S. PATENT DOCUMENTS

| | | | | |
|---|---|---|---|---|
| 6,438,612 | B1 | 8/2002 | Ylonen et al. | 709/249 |
| 6,449,272 | B1 | 9/2002 | Chuah et al. | 370/389 |
| 6,490,289 | B1 | 12/2002 | Zhang et al. | 370/401 |
| 6,507,873 | B1 | 1/2003 | Suzuki et al. | |
| 6,516,417 | B1 | 2/2003 | Pegrum et al. | |
| 6,615,357 | B1 | 9/2003 | Boden et al. | |
| 6,631,416 | B2* | 10/2003 | Bendinelli et al. | 709/227 |
| 6,665,304 | B2 | 12/2003 | Beck et al. | |
| 6,684,256 | B1* | 1/2004 | Warrier et al. | 709/238 |
| 6,697,354 | B1* | 2/2004 | Borella et al. | 370/352 |
| 6,701,358 | B1 | 3/2004 | Poisson et al. | |
| 6,751,729 | B1 | 6/2004 | Giniger et al. | |
| 6,788,681 | B1 | 9/2004 | Hurren et al. | |
| 6,798,782 | B1 | 9/2004 | Caronni et al. | |
| 6,996,628 | B2* | 2/2006 | Keane et al. | 709/238 |
| 7,028,334 | B2* | 4/2006 | Tuomenoksa | 726/3 |
| 2001/0014097 | A1* | 8/2001 | Beck et al. | 370/401 |
| 2001/0032273 | A1 | 10/2001 | Cheng | |
| 2002/0023210 | A1 | 2/2002 | Tuomenoksa | |
| 2002/0026503 | A1 | 2/2002 | Bendinelli et al. | 709/220 |
| 2002/0026531 | A1 | 2/2002 | Keane et al. | 709/250 |
| 2002/0029276 | A1 | 3/2002 | Bendinelli et al. | 709/227 |
| 2002/0053031 | A1 | 5/2002 | Bendinelli et al. | 713/201 |
| 2002/0056008 | A1 | 5/2002 | Keane et al. | 709/245 |
| 2002/0091859 | A1 | 7/2002 | Tuomenoksa et al. | 709/245 |
| 2002/0099937 | A1* | 7/2002 | Tuomenoksa | 713/153 |
| 2002/0124090 | A1 | 9/2002 | Poier et al. | 709/228 |
| 2003/0033401 | A1 | 2/2003 | Poisson et al. | |
| 2003/0108041 | A1* | 6/2003 | Aysan et al. | 370/389 |
| 2003/0131263 | A1 | 7/2003 | Keane et al. | |
| 2003/0145104 | A1* | 7/2003 | Boden et al. | 709/238 |

FOREIGN PATENT DOCUMENTS

| | | |
|---|---|---|
| EP | 0 838 930 A2 | 4/1998 |
| GB | 2 340 702 A | 2/2000 |
| WO | WO 89/08887 | 9/1989 |
| WO | WO 98/59467 | 12/1998 |
| WO | WO 98/59470 | 12/1998 |
| WO | WO 0011832 A | 3/2000 |
| WO | WO 01/80487 A2 | 10/2001 |
| WO | WO 01/80490 A3 | 10/2001 |
| WO | WO 01/82533 A2 | 11/2001 |
| WO | WO 02/17558 A2 | 2/2002 |

OTHER PUBLICATIONS

RFC-2409, Harkins et al., "The Internet Key Exchange," The Internet Society (1998).

RFC-1828, Metzger et al., "IP Authentication Using Keyed MD5," The Internet Society (1995).

RFC-793, "Transmission Control Protocol," Information Sciences Institute for Defense Advanced Research Projects Agency (DARPA) (1981).

RFC-791, "Internet Protocol," Information Sciences Institute for Defense Advanced Research Projects Agency (DARPA) (1981).

Hurwitz Group, "How Small and Midsize Businesses Can Turn the Internet into a Private Network for Competitive Advantage," Jun. 2000, downloaded from http://www.openreach.com on Jan. 4, 2001.

Applied Technologies Group, "A Practical Guide to the Right VPN Solution," 2000, downloaded from http://www.openreach.com on Jan. 23, 2001.

OpenReach, "Demystifying VPN: An Introduction to VPN Technology," 2000, downloaded from http://www.openreach.com on Jan. 4, 2001.

OpenReach, "Private Connections/Open Networks," presented on Feb. 20, 2001.

OpenReach, "Transforming the Internet into My Private Backbone for Business: Demystifying VPNs," presented on Nov. 7, 2000.

NetworkMagazine.com, "Special Report: VPN Overlay Networks: An Answer to Networks-Based IP VPNs?," Jun. 5, 2001, downloaded from http://www.networkmagazine.com on Nov. 5, 2001.

Malkin Gary Scott: "Dial-In Virtual Private Networks Using Layer 3 Tunneling" Proceedings of the Conference on Local Computer Networks, Nov. 2, 1997.

O'Guin, S. et al., "Application of Virtual Private Networking Technology to Standards-Based Management Protocols Across Heterogeneous Firewill-Protected Networks," IEEE, pp. 1251-1255, Oct. 31, 1999.

RFC-2663, P. Srisuresh et al., "IP Network Address Translator (NAT) Technology and Considerations," pp. 1-30, Aug. 1999.

W. T. Teo et al., "Mobile IP extension for Private Internets Support (MPN)," Internet Drafts Archive, 'Online!, pp. 1-24, Feb. 1999, Retrieved from the Internet: URL:http://www.watersprings.org/pub/id/draft-teoyli-mobileip-mvpn-02.txt>, retrieved on Feb. 9, 2005!

* cited by examiner

GATEWAY C

| PROCESSOR NAME | LOCAL ADDRESS | TUNNEL INFO | TRANSLATED ADDRESS |
|---|---|---|---|
| A | "X" | "10" | "X" |
| B | "X" | "11" | "X1" |

METHODS AND SYSTEMS FOR RESOLVING ADDRESSING CONFLICTS BASED ON TUNNEL INFORMATION

DESCRIPTION OF THE INVENTION

1. Field of the Invention

The present invention relates to systems and methods for resolving addressing conflicts and, more particularly, systems and methods for translating addresses based on tunnel information.

2. Background of the Invention

Wide area networks allow users to access company files and computer programs, regardless of where users are geographically located. Until recently, building wide area networks remained the province of only the largest corporations or companies with enough technical skill and financial resources. Organizations have used a range of approaches to building wide area networks to connect remote offices, partners, or employees. These "traditional" approaches to connectivity include, for example, point-to-point leased lines, packet switched networks, and dedicated virtual private networks (VPNs).

Point-to-point leased lines are physical networks requiring the engineering of separate links between sites that need to communicate with each other. Point-to-point leased lines can take from 30 to 90 days to install and are costly.

A packet switched network using frame relay is a traditional alternative to point-to-point leased lines that offers reduced costs and increased flexibility. Like the point-to-point solutions, the initial installation of a frame relay network takes a long time. For example, additional access circuits may usually take two to three weeks for installation and the service is fairly costly.

A more-recently introduced service offered by some network service providers is a dedicated virtual private network. This routed service eliminates the complexity and costs associated with the engineering of connections between dedicated locations, but requires the network service provider to manage security as the network is shared with other customers. A virtual private network is "virtual" because it uses a shared or a base network, such as the Internet as its backbone as opposed to a completely private network with dedicated lines. It is also "private" since the information that is exchanged between the users may be encrypted or encoded to provide privacy.

With the advent and ubiquity of the Internet, virtual private networks have emerged as a way to build a private communication network over a shared public or private infrastructure or functioning as a base network. Virtual private networks provide secure private connections over the Internet by enabling authentication of users and locations, delivering secure and private "tunnels" between users or locations, and encrypting user communications. Moreover, virtual private networks facilitate computers in different networks using different addressing schemes to communicate privately over a shared or base network, such as the Internet.

Before virtual private networks, a single entity (or processor) allocated addresses to computer on a network (or subnetwork), ensuring address compatibility—i.e., no two computers in a network use the same address. But with virtual private networks, computers in different networks may be under the control of different entities. These entities might assign to computers addresses that are in conflict with each other. When that is the case, a central entity (or controller) must resolve the address conflict by negotiating mutually agreeable unique addresses for the computers having the conflict. Once mutually agreeable addresses are determined, each computer's address is converted (e.g., using a network address translation (NAT) protocol) into the negotiated addresses.

By way of example, if three computers in different networks (or subnetworks) share identical addresses, a processor may negotiate addresses that do not pose a conflict to the three computers and/or their networks. When the negotiated addresses are determined, each packet address transmitted by a computer would then be translated (using e.g., NAT) into a negotiated address and then forwarded on a network. Without performing this negotiation and translation, the computers would not be able to communicate.

Using an address space that is negotiated by a central authority does serve as a solution to resolving address conflicts. Nevertheless, the mutually agreed address approach described above is less effective when the number of computers is large. That is, it is much more difficult to negotiate addresses for 1000 computers, when compared to 3 computers. Accordingly, there is a need to find a less cumbersome approach for resolving address conflicts in networks.

SUMMARY OF A FEW ASPECTS THE INVENTION

To address the above and other limitations of the prior art, systems and methods are provided to facilitate the resolution of an addressing conflict between a first processor in a first network and a second processor in a second network. When an addressing conflict is detected between a first address of the first processor and a second address of the second processor, tunnel information is removed from one or more packets received from the first processor. Based on the removed tunnel information, the packets are associated with the detected addressing conflict and a translated address is determined. Based on the translated address, the packets are then forwarded.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

The accompanying drawings, which are incorporated in and constitute a part of this specification, illustrate several embodiments of the invention and together with the description, serve to explain the principles of the invention.

BRIEF DESCRIPTION OF THE DRAWINGS

FIG. 5 is an exemplary list (or table) for determining an address, in accordance with methods and systems consistent with the present invention.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

In accordance with an embodiment of the invention, an addressing conflict is resolved between processors in a virtual private network that includes one or more tunnels. An addressing conflict may exist when, for example, a first processor in a first network and a second processor in a second network use addresses that conflict, such as when the addresses are identical, when the networks (or subnetworks) have overlapping address ranges, and/or any other conflict affecting the resolution of a packet source or destination. When an address conflict is present, a packet address may not be uniquely resolvable. That is, the destination and the source of the packet cannot be readily determined, and therefore, either the packet cannot be routed to the proper destination or replies cannot be sent to the proper source.

In this embodiment, to resolve the addressing conflict between the first processor in the first network and the second processor in the second network, a processor serving as a gateway receives packets that form a tunnel through a communication channel, such as the Internet. That gateway removes from the packets information about the tunnel, determines a translated address based on removed information, and forwards the packet using the translated address. Accordingly, the gateway eliminates the address conflict between the first and second processors.

Figure 1:
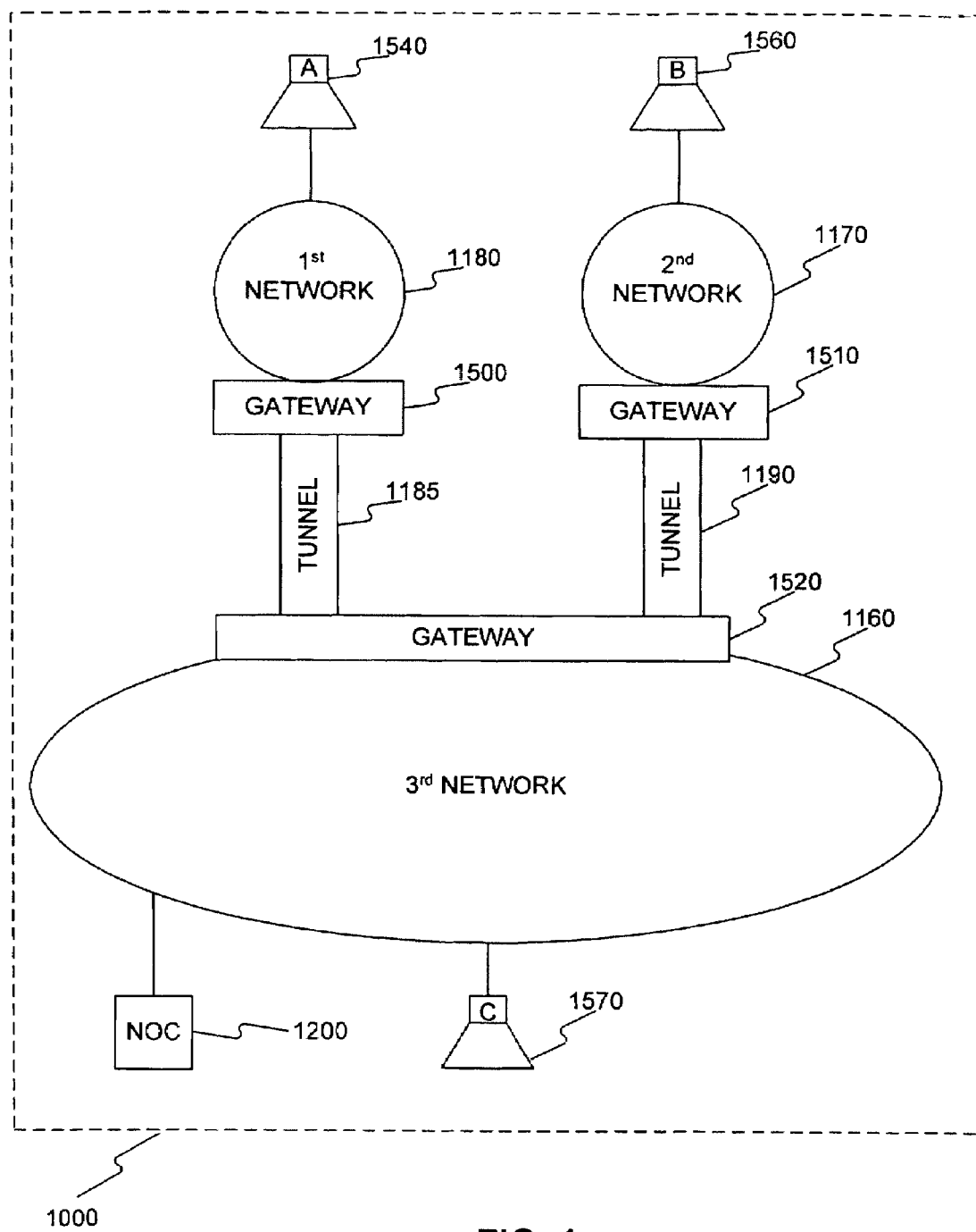
FIG. 1 is a general block diagram of a first exemplary network, in accordance with methods and systems consistent with the present invention.

FIG. 1 shows a general block diagram of a network 1000, in accordance with systems and methods consistent with the present invention. The network 1000 may include one or more networks (or subnetworks) 1160-1180, one or more processors 1540-1570, one or more processors serving as gateways 1500-1520, and one or more tunnels 1185,1190.

Figure 2:
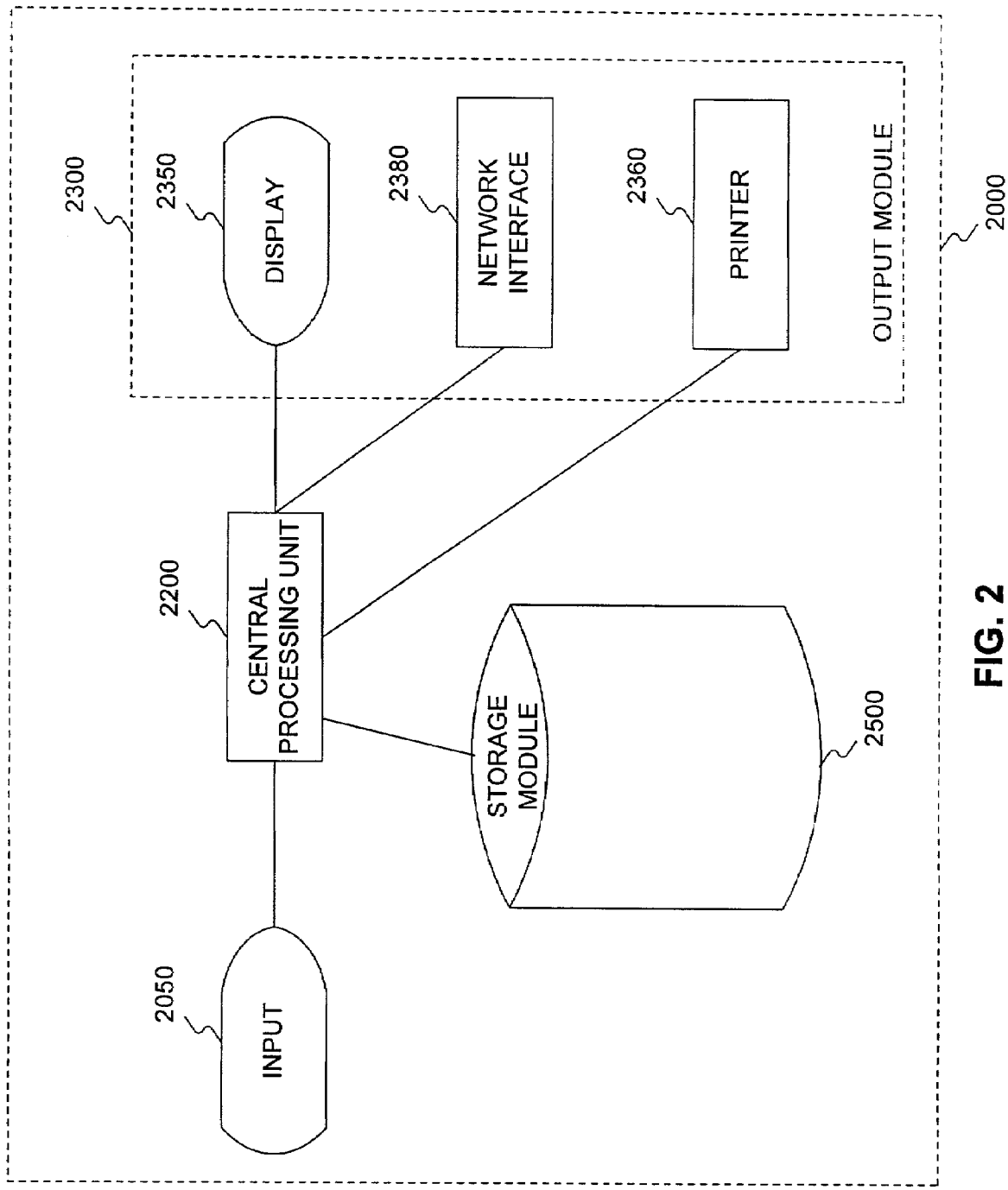
FIG. 2 is a general block diagram of an exemplary processor, in which systems and methods consistent with the present invention may be implemented.

The processors 1540-1570 may each include a computer 2000 shown in FIG. 2. The computer 2000 may include an input module 2050, a central processing unit (CPU) 2200, a storage module 2500, and an output module 2300. The output module 2300 may include a display 2350, a printer 2360, and a network interface 2380. Although FIG. 2 shows a computer 2000, the processors 1540-1570 may each instead include any other device, such as printers, personal digital assistants, wireless devices, mobile phones, routers, servers, and firewalls.

The input module 2050 may be implemented with a variety of mechanisms to receive a user's input and/or provide the input to the CPU 2200. Some of these devices (not shown) may include, for example, a network interface module, a modem, a keyboard, a mouse, and an input storage device.

Although FIG. 2 illustrates only a single CPU 2200, computer 2000 may alternatively include more than one CPU. The CPU 2200 may also include, for example, one or more of the following: a co-processor, memory, registers, and other processing devices and systems as appropriate.

The storage module 2500 may be embodied with a variety of components or subsystems including, for example, a hard drive, an optical drive, a general-purpose storage device, a removable storage device, and/or other devices capable of storing. Further, although storage module 2500 is illustrated in FIG. 2 as being separate or independent from CPU 2200, the storage module and CPU 2200 may be implemented as part of a single platform or system.

Referring again to FIG. 1, the networks 1160-1180 may facilitate communication between the various entities depicted in the network 1000. The networks 1160-1180 may include, for example, a telephony-based network, a local area network (LAN), a wide area network (WAN), a dedicated Intranet, the Internet, and/or a wireless network. Further, any suitable combination of wired and/or wireless components and systems may be incorporated into the networks 1160-1180. Any suitable combination of point-to-point communications or network communications may also be incorporated into the networks 1160-1180 to facilitate communication between the entities illustrated in FIG. 1. Moreover, one or more of the networks may be a shared network, such as the Internet, or a dedicated network, such as an intranet or point-to-point link.

Each gateway 1500-1520 may include a processor (or computer) capable of establishing a tunnel (e.g., tunnels 1185, 1190) to another processor, such as another gateway. Moreover, each gateway may be part of a virtual private network and may be under the management and/or control of a network operations center (or controller). Descriptions of an exemplary gateway and exemplary network operations center (or controller) are provided in pending U.S. application Ser. No. 09/832,341, titled "METHODS AND SYSTEMS FOR MANAGING VIRTUAL ADDRESSES FOR VIRTUAL NETWORKS," which is incorporated herein by reference in its entirety.

Although FIG. 1 depicts the gateways 1500-1520 as separate from the processors 1540-1570, one of ordinary skill in the art will recognize that each of the processors 1540-1570 may also function as a gateway or vice versa.

Each of the tunnels 1185, 1190, established by a gateway (or processor), forms an encrypted information flow providing privacy to the communications therein. A tunnel (also referred to as encrypted tunnel) may be established through a base network, such as the Internet, by encapsulating a protocol within another protocol. For example, a tunnel may be encrypted when an Internet Protocol (IP) packet encapsulates an encryption protocol. Examples of encryption protocols may include RSA, Digital Encryption Standard (DES), and Triple DES (3DES). In one embodiment, a tunnel may be established using Internet Protocol (IP) packets such that the payload of each packet is encrypted but the address of each packet is unencrypted (i.e., clear-text). As a result, the encrypted payload may be encapsulated by a clear text IP address, forming a virtual tunnel through a base network, such as the Internet.

The virtual tunnel established between two gateways may have a virtual address that uniquely identifies the tunnel at each gateway. Each gateway may also have a real world (or public) IP address that permits packets to be communicated to and from the gateway.

For example, a processor may encrypt a packet and also add virtual addresses to identify the source and the destination of the tunnel and to permit the encrypted packet to be routed through the tunnel. Moreover, the processor may add (also commonly referred to as wrap or encapsulate) public IP addresses for the source and destination gateways interfacing the tunnel. The public IP addresses may thus facilitate routing the packet from the source gateway to destination gateway.

Although FIG. 1 shows two tunnels 1185, 1190, a plurality of gateways, processors, and tunnels may also be implemented. Moreover, when tunnels are established through the Internet between one or more gateways, these tunnels may be referred to as virtual tunnels. Furthermore, if the tunnels are encrypted, the resulting network may be referred to as a virtual private network.

Figure 3:
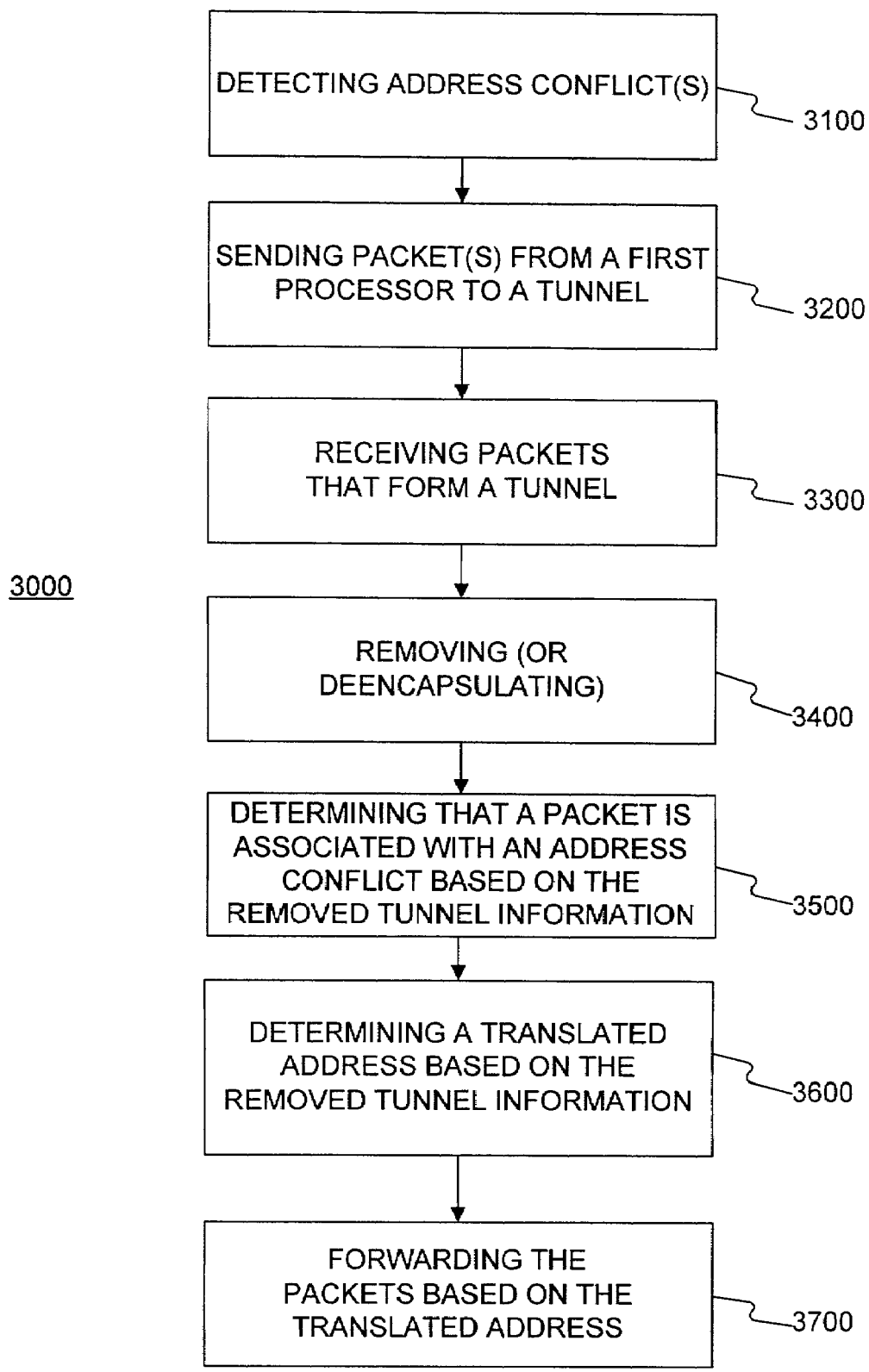
FIG. 3 is an exemplary flow chart for resolving addressing conflicts, in accordance with methods and systems consistent with the present invention.

FIG. 3 illustrates an exemplary flow chart of the steps for resolving address conflicts, in accordance with methods and systems consistent with the present invention. Each of these steps will be discussed in further detail following the broad description of FIG. 3.

Referring to FIGS. 1 and 3, when a first processor (e.g., processor 1540) and a second processor (e.g., processor 1560) have an address conflict, the address conflict may be detected by a gateway (step 3100). For example, the first processor 1540 may use "X" as an address in network 1180, while the second processor 1560 may also use "X" as an address in network 1170.

FIG. 3 depicts exemplary steps 3000 for resolving an address conflict between a first processor in a first network and a second processor in a second network. FIG. 3 depicts the step of detecting the address conflict (step 3100); sending packets from the first processor to a tunnel (step 3200); receiving packets that form the tunnel (step 3300); removing from the packets information about the tunnel (step 3400); determining that the packets are associated with the detected addressing conflict based on the removed tunnel information (step 3500); determining a translated address based on the removed tunnel information (step 3600); and forwarding the packets based on the translated address (step 3700).

Figure 4:
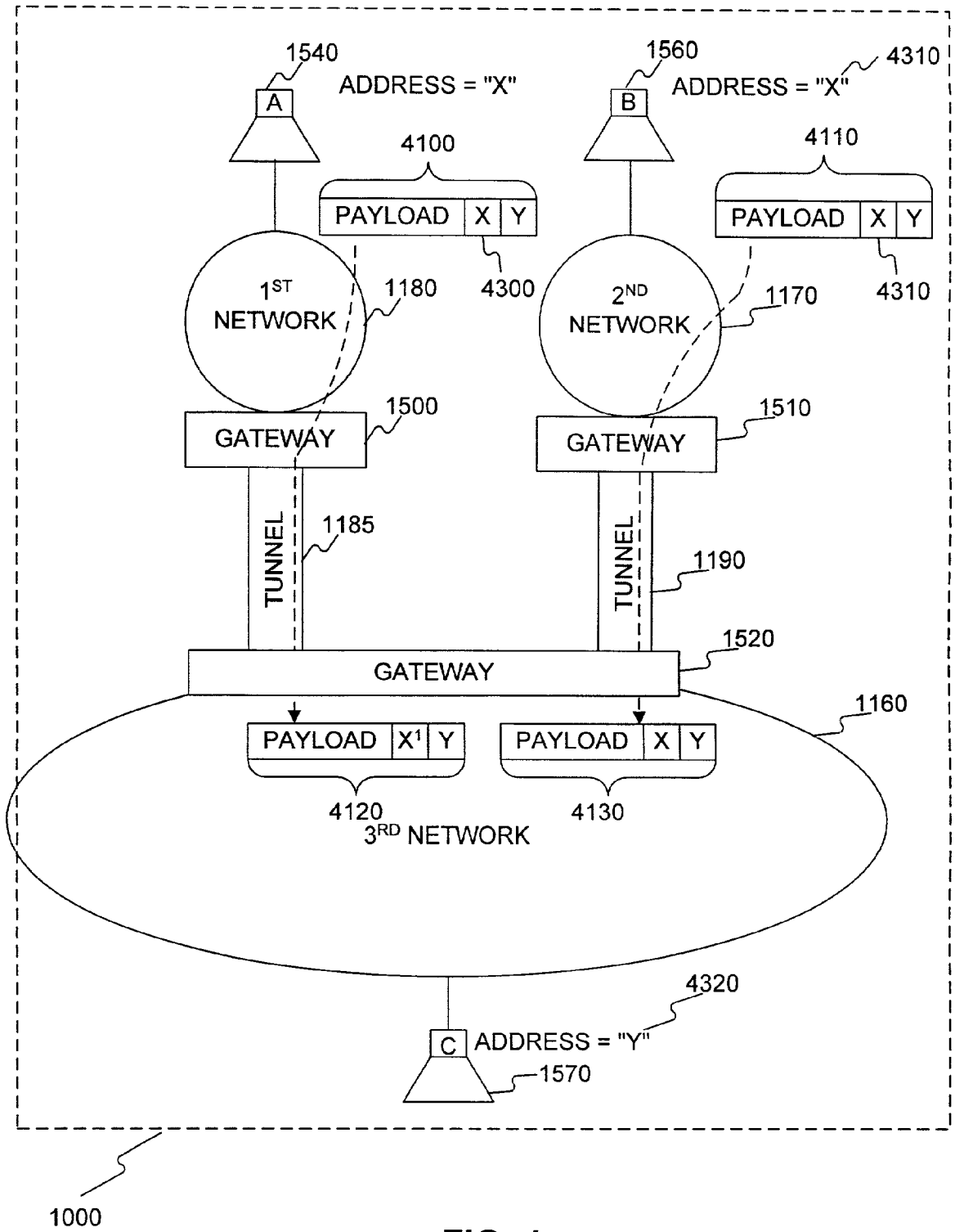
FIG. 4 is a general block diagram of a second exemplary network, in accordance with methods and systems consistent with the present invention.

The above steps of FIG. 3 are now described with respect to FIG. 4. FIG. 4 depicts the exemplary network 1000 of FIG. 1 further including a processor 1540 that generates a packet 4100 with a source address "X" 4300, a processor 1560 that generates a packet 4110 with a source address "X" 4310, and a processor 1570 with an address "Y" 4320. In network 1000, there is an address conflict because the address "X" 4300, 4310 is shared by both processors 1540, 1560. This address conflict may be detected by one of the gateways 1500-1520 and resolved as described in the embodiment below (step 3100).

In one embodiment, the gateways 1500-1520 and the tunnels 1185, 1190 may form a virtual private network, where each tunnel is enabled by a network operations center 1200. The network operation center 1200 may also detect the address conflict when the network operations center 1200 enables the establishment of tunnels 1185, 1190. The network operations center 1200 may then notify a gateway about the address conflict.

A first processor, such as the processor 1540, may send a packet 4100 to the processor 1570 at address Y via the network 1180 and gateway 1500. The gateway 1500 may process the packet 4100 by adding tunnel information that encapsulates the packet with an address of the tunnel 1185; encrypting the packet 4100; and adding the real (or public) IP addresses of the source and destination gateways. The address of the tunnel 1185 may correspond to a virtual IP (VIP) address, identifying the address of the tunnel at the gateway 1500. The gateway 1500 may then forward the processed packet.

The gateway 1520 interfacing network 1160 may then receive through the tunnel 1185 the packet (step 3300); remove the public IP addresses; and remove (also commonly referred to as unwrap or deencapsulate) the VIP address associated with the tunnel 1185 (step 3400). The gateway 1520 may also decipher the packet, if necessary. At this point, the packet includes its original payload and address (see, e.g., packet 4100). However, the source address "X" 4300 is not unique in the network 1160 since the processor 1570 cannot resolve whether the packet 4100 originated at the first processor 1540 or the second processor 1560.

Based on the removed tunnel information, the gateway 1520 may then determine that the packet is associated with the address conflict between the first and second processors 1540, 1560 (step 3500). For example, the gateway 1520 may determine that any packet received from tunnel 1185 should be evaluated for a possible address conflict.

The gateway 1520 may resolve the address conflict by determining a translated address based on the removed tunnel information (step 3600). For example, the gateway 1520 may determine a translated address for the packet based on the information removed from the tunnel, such as the VIP address of the tunnel 1185, and/or the source address associated with the packet 4100 (e.g., address "X" 4300). In this example, the gateway 1520 may add the translated address to the packet 4100. An exemplary packet 4120 with its translated address ($X^1$) is depicted in FIG. 4, where the payload of packet 4120 includes the packet 4100. Although in this embodiment the translated address ($X^1$) is added to packet 4120, the translated address may alternatively replace the address "X" in packet 4100.

In another embodiment, the gateway 1520 may maintain a list (or table) to facilitate determining translated addresses. FIG. 5 shows one example of such a list. As shown, the gateway 1520 may store a list that includes the name of a processor, an address on the processor's local network, tunnel information, and a translated address in network 1160 that interfaces gateway 1520. For example, the gateway 1520 may store: a name "A" for the processor 1540, a local address of "X", a tunnel address (such as a VIP address) of "10", and a translated address of "$X^1$". The gateway 1520 may determine the translated address as $X^1$ when the VIP is "10" and the local address is "X."

The gateway 1520 may also forward the packet 4120 to a destination address (e.g., address "Y") in the network 1160 such that the packet 4120 is received by processor 1570 (step 3700). As a result, the processor 1570 may receive packets from the first processor 1540 without the address conflict, enabling the processor 1570 to communicate with the first processor. Moreover, the gateway 1520 may resolve the address conflict locally without negotiating an acceptable address with the gateway 1500.

While the first processor 1540 sends packets, the second processor 1560 may also send a packet 4110 through the network 1170, gateway 1510, and tunnel 1190 (step 3200). The gateway 1520 may then receive the packet 4110 and remove the tunneling information, such as the VIP address of the tunnel. Based on the removed tunnel information, the gateway 1520 may then determine that the packet 4110 is associated with the address conflict at "X" (steps 3300-3500).

Based on the removed tunnel information, the gateway 1520 may also determine a translated address as described above in step 3600. The gateway 1520 may then add the translated address to the packet and then forward the packet to processor 1570 without the address conflict (step 3700).

When the gateway 1520 translates addresses for the first processor 1540 to "$X^1$," the network 1160 (or processors therein) may then be able to distinguish between the translated address "$X^1$" and "X." If that is the case, the gateway 1520 may determine that a translation is not necessary because in network 1160 the address "X" associated with the second processor 1560 does not conflict with the address "$X^1$" associated with the first processor 1540. Accordingly, the gateway 1520 interfacing network 1160 may translate address "X" to "$X^1$" for the processor 1540 (see, e.g., packet 4120) while not translating address "X" for the second processor 1560 (see, e.g., packet 4130).

Figure 6:
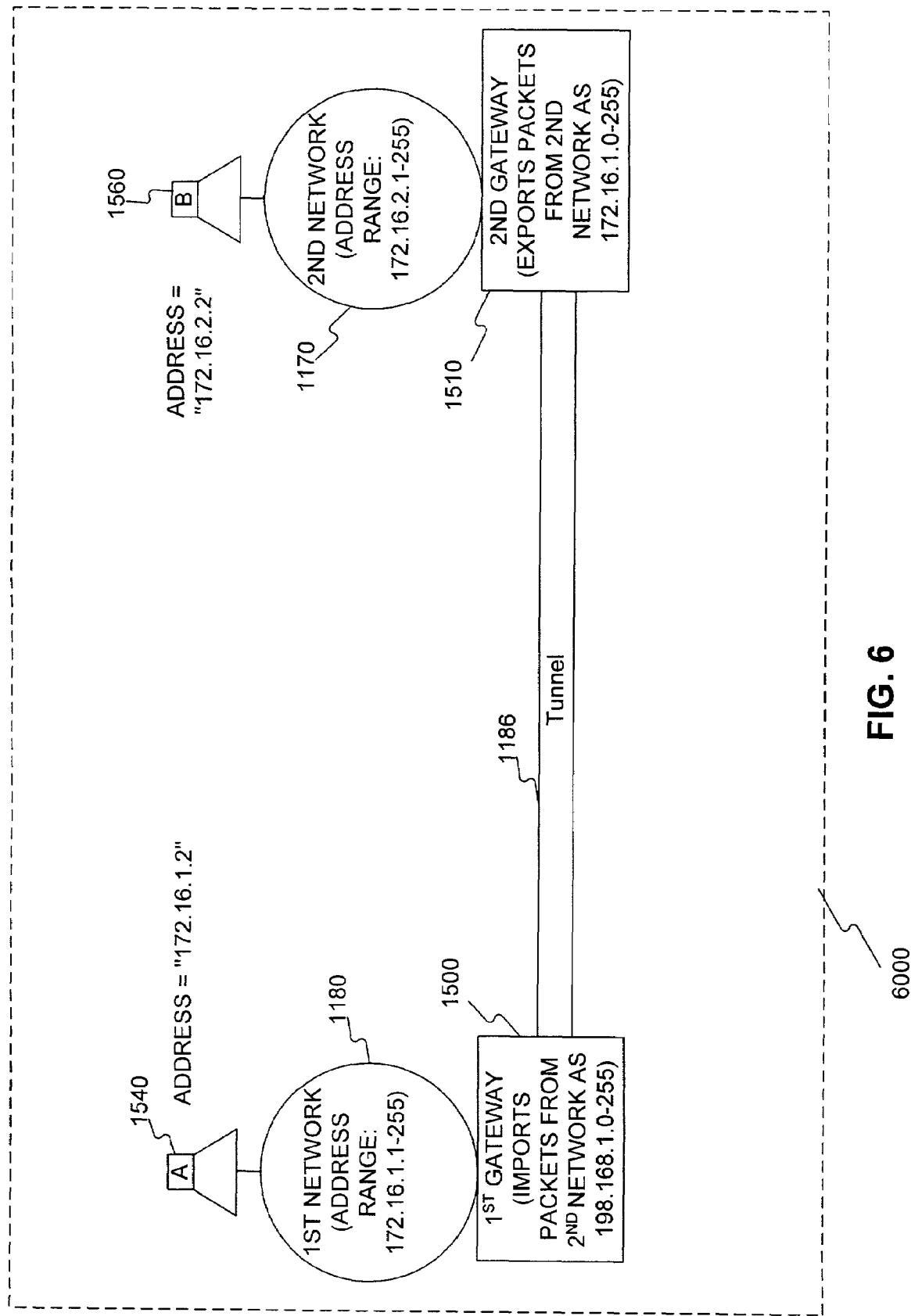
FIG. 6 is a general block diagram of a third exemplary network, in accordance with methods and systems consistent with the present invention.

FIG. 6 shows an exemplary network 6000 in accordance with methods of systems consistent with the present invention. The network 6000 may include a first processor 1540 connected to a network 1180 that interfaces with the first gateway 1500 and a second processor 1560 connected to a network 1170 that interfaces with second gateway 1510. Furthermore, a tunnel 1186 is established between gateway 1500, 1510 through a communication channel such as the Internet.

In the embodiment of FIG. 6, the first gateway 1500 interfaces a network 1180 with an address range of 172.16.1.1-255 (i.e., the processors in the network 1180 use addresses within this range) with the first processor 1540 at an address 172.16.1.2. The second gateway 1510 interfaces a network 1170 with an address range of 172.16.2.1-255 with the second processor 1560 at an address 172.16.2.2. Although this addressing scheme does not pose an address conflict, the second gateway 1510 actually exports (or translates) packets within the address range of 172.16.1.0-255, rather than in the range 172.16.2.1-255. As a result, the second gateway 1510 may export the address of the second processor as 172.16.1.2 rather than 172.16.2.2. By hiding its true addresses, the gateway 1510 exports packets that create an address conflict with the first processor 1540 (also at 172.16.1.2).

When the gateways 1500, 1510 establish tunnel 1186, the gateways 1500, 1510 may exchange information including the addresses of the networks (or subnetworks) attached to each gateway. At that time, the first gateway 1500 may detect an address conflict because the addresses associated with the second network 1170 (i.e., the exported addresses) conflict with the addresses associated with the first network 1180 (step 3100 at FIG. 3). As noted above, the second gateway 1510 exports packets from processor 1560 at an address 172.16.1.2, conflicting with the address of the processor 1540.

In resolving the address conflict with the second gateway 1510, the first gateway 1500 may also determine an address range 192.168.1-255 for packets received from the second gateway 1510 through tunnel 1186. Accordingly, the first gateway 1500 may resolve the address conflict without negotiating addresses with the second gateway 1510 or the second processor 1560.

Referring to FIGS. 3 and 6, the second processor 1560 may send a packet to the network 1170 and gateway 1510 (step 3200). The second processor 1560 may address the packet as follows:

<SRC=172.16.2.2><DEST=172.16.1.2>, where "SRC" is the source address of the packet, and "DEST" is the packet destination. The gateway 1510 may then receive the packet bound for tunnel 1186 and readdress the source address by using a network address translation (NAT) protocol. For example, the readdressed packet may appear as follows:

<SRC=172.16.1.2><DEST=172.16.1.2>, where "SRC" is the exported address of the packet, and "DEST" is the destination address in the first network 1180. As noted above, the gateway 1510 may readdress the source address to export (or make public) a different address range than the address range that is actually used on network 1170. When this readdressing occurs, the packet creates an address conflict in the first network 1180 since the source address 172.16.1.2 conflicts with the destination address 172.16.1.2 in the first network 1180.

The second gateway 1510 may also encrypt the payload of the packet; add VIP addresses to identify the source and destination addresses of the tunnel 1186; and then add public IP addresses to the packet. The packet may thus have the following form:

<PUBLIC SRC=128.6.4.4><PUBLIC DEST=64.15.12.1>

<VIP SRC=10.2.3.4><VIP DEST=10.1.2.3>

{<PAYLOAD><SRC=172.16.1.2><DEST=172.16.1.2>}, where "PUBLIC SRC" is the public source address of the packet, and "PUBLIC DEST" is the destination IP address. The Internet (or intranet) may then route based on the PUBLIC SRC and PUBLIC DEST addresses. The "VIP SRC" represents the VIP address of the tunnel 1186 at the second gateway 1510, while "VIP DEST" is the VIP address of the tunnel 1186 at the first gateway 1500. Moreover, in the above example, payload, source address (SRC), and destination address (DEST) are contained by braces "{" and "}," indicating that they are encrypted.

The first gateway 1500 may then receive the packet that forms the tunnel 1186 (step 3300); remove the public IP addresses; remove the VIP address identifying the tunnel 1186 (step 3400); and decrypt the packet.

Based on the information removed in step 3400 which identified the packet as originating from tunnel 1186, the first gateway may determine that the packets are associated with the detected address conflict (step 3500). For example, the first gateway 1500 may determine that packets forming tunnel 1186 also originate at the second gateway 1510, which is the gateway with the address conflict.

The first gateway may further determine a translated address based on the removed tunnel information (step 3600). For example, the first gateway 1500 may translate a packet based on a VIP address and/or a source address. In this example, the first gateway 1500 would translate a source address "SRC=172.16.1.2" of a packet from the tunnel 1186 and processor 1560 to read as follows:

<SRC=198.168.1.2><DEST=172.16.1.2.1.

The first gateway 1500 may then forward the packet based on the translated address of 198.168.1.2 to the first processor 1540 via the first network 1180 (step 3700).

On the other hand, when the first processor 1540 sends a packet to the second processor 1560 through the network 1180 and gateway 1500, the first processor 1540 may address the packet as follows:

<SRC=172.16.1.2><DEST=192.168.1.2>, where "SRC" is the source address of the packet, and "DEST" is the translated address for the second processor 1560 in the network 1180.

The first gateway 1500 may receive the packet and determine that the packet is associated with the address conflict. For example, when the first gateway 1500 receives a packet, the first gateway 1500 may process the address and, based on the destination address 192.168.1.2, determine that the packet is associated with the address conflict of the second gateway 1510.

The first gateway 1500 may then readdress the packet to an address that the second gateway 1510 recognizes. In this example, the first gateway 1500 translates (or maps) the address from 192.168.1.2 to 172.16.1.2, which is the address recognized by the second gateway 1510.

The first gateway 1500 may also encrypt the packet; add VIP addresses to identify the source/destination addresses of the tunnel 1186; and then add public IP addresses to the packet. The packet may thus have the following form:

<PUBLIC SRC=64.15.12.1><PUBLIC DEST=128.6.4.4>

<VIP SRC=10.1.2.3><VIP DEST=10.2.3.4>

{<PAYLOAD><SRC=172.16.1.2><DEST=172.16.1.2>}.

The second gateway 1510 may then receive the packet from the tunnel 1186; remove the public IP addresses; remove the VIP addresses identifying the tunnel 1186; decipher the packet; and translate the packet to the actual address used on second network 1170, resulting in the following addresses for the packet:

<SRC=172.16.1.2><DEST=172.16.2.2>.

The second gateway 1540 may then forward the packet to the second processor 1560 on the first network 1170.

Although in the above description of FIG. 6, the second gateway 1510 creates the addressing conflict when it exports (or translates) addresses from the second network 1170, the address conflict may be inherently present because the second processor 1160 may instead implement an address, such as 172.16.1.2 that conflicts directly with the first network 1180 (or processor 1540). If that is the case, the systems and methods described above may also resolve such addressing conflict.

The above embodiments and other aspects and principles of the present invention may be implemented in various environments. Such environments and related applications may be specially constructed for performing the various processes and operations of the invention or they may include a general-purpose computer or computing platform selectively activated or reconfigured by program code (also referred to as code) to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the present invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example micro-code, machine code, such as produced by a compiler, and files containing a high-level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A network, comprising:
   a first processor on a first network that has a first address range;
   a second processor on a second network that has a second address range; and
   a third processor on a third network that has a third address range, other than the first and second processors, that detects a conflict between the first address range and the second address range prior to communication with the first network and the second network and resolves the conflict based on address translation information retrieved using a virtual address of a tunnel established between the third processor and the first processor, such that communication between the first network and the third network and communication between the second network and the third network is enabled,
   wherein the third processor detects the conflict between the first address range and the second address range by receiving the first address range and the second address range, comparing the first address range and the second address range, and determining an overlap in the first address range and the second address range, and
   the third processor determines at least one translated address without regard to the first network and second network, such that the conflict is resolved locally on the third network other than the first network and second network.

2. The network of claim 1, wherein the third processor determines a translated address based on the virtual address of the tunnel and forwards one or more packets to the second network based on the translated address.

3. The network of claim 1, wherein the third processor functions as a gateway.

4. The network of claim 1, wherein the third processor resolves the conflict based on another virtual address of another tunnel established between the third processor and the second network.

* * * * *